US012684680B2

(12) United States Patent
Carducci et al.

(10) Patent No.: US 12,684,680 B2
(45) Date of Patent: Jul. 14, 2026

(54) LOW-K RF ROD FOR RF BIAS POWER DELIVERY

(71) Applicant: Applied Materials, Inc., Santa Clara, CA (US)

(72) Inventors: James Carducci, Sunnyvale, CA (US); Kiran Honnavar, Bangalore (IN); Silverst Rodrigues, San Jose, CA (US); Kartik Ramaswamy, San Jose, CA (US); Larry Elizaga, Tracy, CA (US)

(73) Assignee: Applied Materials, Inc., Santa Clara, CA (US)

( * ) Notice: Subject to any disclaimer, the term of this patent is extended or adjusted under 35 U.S.C. 154(b) by 28 days.

(21) Appl. No.: 18/762,519

(22) Filed: Jul. 2, 2024

(65) Prior Publication Data

US 2026/0013029 A1 Jan. 8, 2026

(51) Int. Cl.

*H05H 1/46* (2006.01)
*H05H 1/00* (2006.01)
*H05H 1/52* (2006.01)

(52) U.S. Cl.

CPC ........ *H05H 1/4645* (2021.05); *H05H 1/0081* (2013.01); *H05H 1/52* (2013.01)

(58) Field of Classification Search

None

See application file for complete search history.

(56) References Cited

U.S. PATENT DOCUMENTS

2009/0321019 A1* 12/2009 Chen ................ H01J 37/32091 156/345.48
2011/0297650 A1 12/2011 Tavassoli et al.
2019/0371579 A1 12/2019 Brown et al.
2021/0166915 A1 6/2021 Hammond, IV et al.

FOREIGN PATENT DOCUMENTS

KR 1020210056646 A 5/2021
KR 1020220149749 A 11/2022

OTHER PUBLICATIONS

International Search Report and Written Opinion from PCT/US2025/030839 dated Sep. 2, 2025, 11 pgs.

* cited by examiner

*Primary Examiner* — Kenneth B Wells

(74) *Attorney, Agent, or Firm* — Schwabe, Williamson & Wyatt, P.C.

(57) ABSTRACT

Embodiments described herein relate to an apparatus that includes an inner rod assembly. In an embodiment, the inner rod assembly includes a first rod and a second rod oriented approximately ninety degrees with respect to the first rod. In an embodiment, a bridge is electrically coupled to the first rod and the second rod. In an embodiment, a first insulator is over an outer surface of the inner rod assembly, and a shell is provided around the inner rod assembly. In an embodiment, a second insulator is provided over an outer surface of the shell, and a housing surrounds the shell. In an embodiment, an interior surface of the housing is spaced away from the second insulator by an air gap.

20 Claims, 8 Drawing Sheets

LOW-K RF ROD FOR RF BIAS POWER DELIVERY

BACKGROUND

1) Field

Embodiments of the present disclosure pertain to the field of RF bias power delivery to a chuck within a plasma chamber with an L-rod assembly.

2) Description of Related Art

In semiconductor manufacturing, the RF bias power is supplied by one or more bias generators. The RF bias power passes through a match, and is connected to an RF rod that is connected to the bottom of the cathode of an electrostatic chuck (ESC). Thus, the RF rod is an important part of the circuit that delivers RF power from the RF match to the ESC. The RF rod is often shaped as a J in order to route the RF power laterally from the RF match and vertically within the pedestal to the ESC. However, the curvature of the J-shaped rod makes manufacture of the RF rod expensive. Additionally, the installation and/or repair of the RF rod is made more difficult due to the J-shaped construction. Further, existing RF rod designs suffer from high capacitance from power to ground. This decreases the efficiency of power delivery. However, higher voltages are also not able to be used to overcome efficiency limitations since current J-shaped RF rods have issues with arcing at high voltages.

SUMMARY

Embodiments described herein relate to an apparatus that includes an inner rod assembly. In an embodiment, the inner rod assembly includes a first rod and a second rod oriented approximately ninety degrees with respect to the first rod. In an embodiment, a bridge is electrically coupled to the first rod and the second rod. In an embodiment, a first insulator is over an outer surface of the inner rod assembly, and a shell is provided around the inner rod assembly. In an embodiment, a second insulator is provided over an outer surface of the shell, and a housing surrounds the shell. In an embodiment, an interior surface of the housing is spaced away from the second insulator by an air gap.

Embodiments described herein relate to an apparatus that includes a chamber, and a chuck within the chamber. In an embodiment, a rod assembly is electrically coupled to the chuck. In an embodiment, the rod assembly includes a first electrical path, a first insulator over the first electrical path, a second electrical path around the first insulator, a second insulator over the second electrical path, and a housing around the second insulator. In an embodiment, at least a portion of the housing is spaced away from the second insulator by an air gap.

Embodiments described herein relate to an apparatus that includes an inner rod assembly. In an embodiment, the inner rod assembly includes a first rod, and a second rod. In an embodiment, a bridge is electrically coupled to the first rod and the second rod. In an embodiment, the inner rod assembly has an L-shape. In an embodiment, a first insulator is provided over an outer surface of the inner rod assembly, and a shell is provided around the inner rod assembly. In an embodiment, an inner surface of the shell directly contacts the first insulator. In an embodiment, a second insulator is provided over an outer surface of the shell, and an insulating corner reinforcement is provided around the bridge. In an embodiment, the insulating corner reinforcement wraps around the shell. In an embodiment, a portion of an interior surface of a housing around the shell is spaced away from the second insulator by an air gap.

DETAILED DESCRIPTION

Figure 1A:
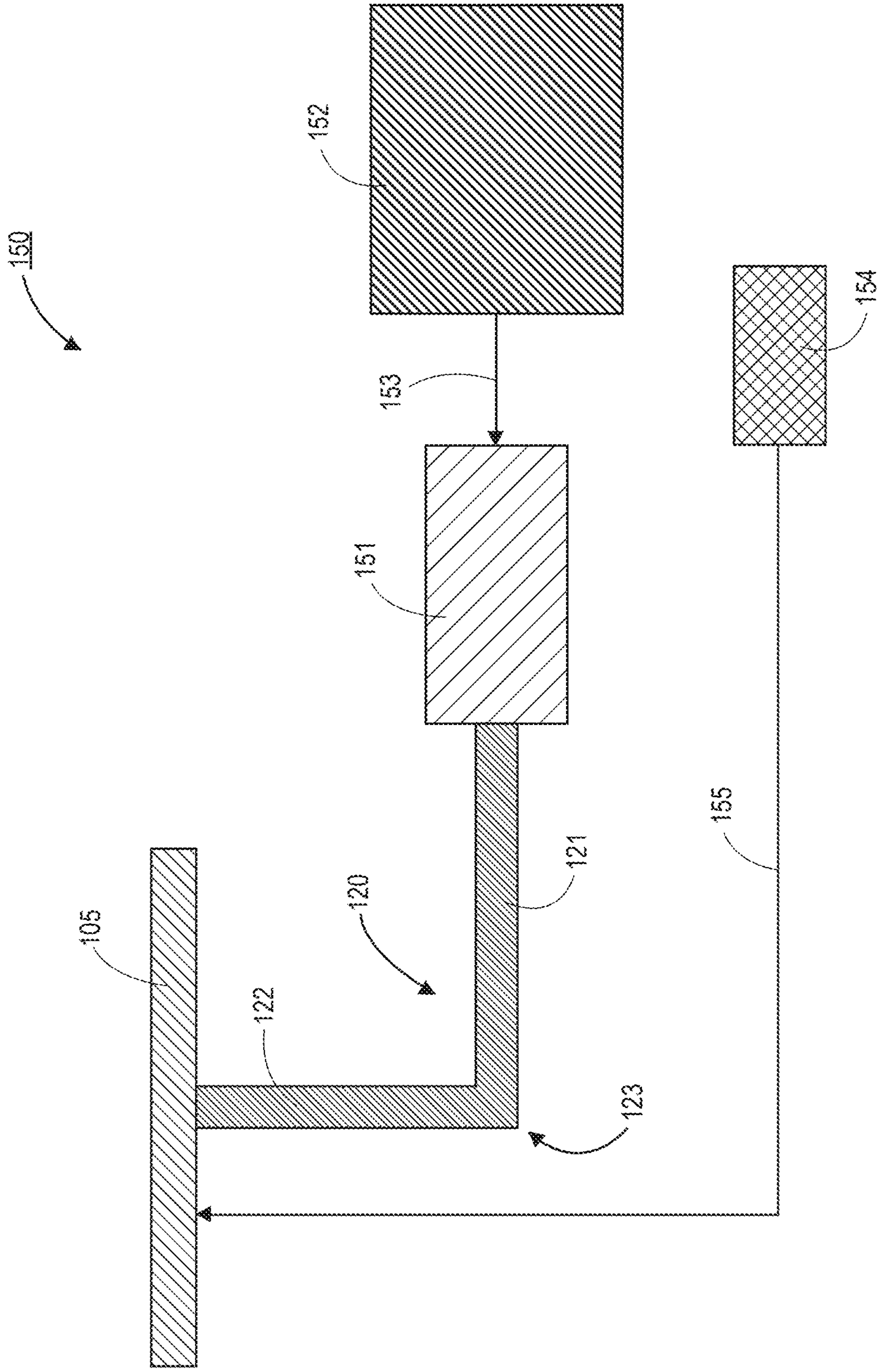
FIG. 1A is schematic illustration of a plasma processing system that comprises a chuck that is electrically coupled to a radio frequency (RF) match and a direct current (DC) bias source, in accordance with an embodiment.

Systems and methods for supplying radio frequency (RF) bias power to a chuck within a plasma chamber through an L-shaped rod assembly are disclosed herein, in accordance with various embodiments. In the following description, numerous specific details are set forth in order to provide a thorough understanding of embodiments. It will be apparent to one skilled in the art that embodiments may be practiced without these specific details. In other instances, well-known aspects are not described in detail in order to not unnecessarily obscure embodiments. Furthermore, it is to be understood that the various embodiments shown in the accompanying drawings are illustrative representations and are not necessarily drawn to scale.

Various embodiments or aspects of the disclosure are described herein. In some implementations, the different embodiments are practiced separately. However, embodiments are not limited to embodiments being practiced in isolation. For example, two or more different embodiments can be combined together in order to be practiced as a single device, process, structure, or the like. The entirety of the various embodiments can be combined together in some instances. In other instances, portions of a first embodiment can be combined with portions of one or more different embodiments. For example, a portion of a first embodiment can be combined with a portion of a second embodiment, or a portion of a first embodiment can be combined with a portion of a second embodiment and a portion of a third embodiment.

The embodiments illustrated and discussed in relation to the figures included herein are provided for the purpose of explaining some of the basic principles of the disclosure. However, the scope of this disclosure covers all related, potential, and/or possible, embodiments, even those differing from the idealized and/or illustrative examples presented. This disclosure covers even those embodiments which incorporate and/or utilize modern, future, and/or as of the time of this writing unknown, components, devices, systems, etc., as replacements for the functionally equivalent, analogous, and/or similar, components, devices, systems, etc., used in the embodiments illustrated and/or discussed herein for the purpose of explanation, illustration, and example.

As noted above, the curvature of existing J-shaped RF rods makes manufacture of the RF rod expensive, and the J-shape complicates the installation and/or maintenance of the RF rod. The presently used RF rod designs also suffer from high capacitance from power to ground. This decreases the efficiency of power delivery. However, higher voltages are also not able to be used to overcome efficiency limitations since current J-shaped RF rods have issues with arcing at high voltages.

Accordingly, embodiments disclosed herein include an RF rod assembly that is modular. In some embodiments, the modular RF rod may have an L-shape. In such an embodiment, a horizontal portion of the RF rod is coupled to a vertical portion of the RF rod by an electrically conductive bridge that has an approximately ninety degree bend. However, it is to be appreciated that the corner region may have any suitable angle to fit the structure of the plasma processing chamber. The modular design of the RF rod assembly allows for simpler manufacture of the individual components, since there is no need to bend metal rods, shells, or the like. That is, a majority of the individual components that are used for the electrical paths through the RF rod assembly may be substantially linear.

In an embodiment, the modular RF rod assembly may also address the poor capacitance issues seen in existing RF rods. For example, the capacitance may be reduced through the inclusion of an overmolded insulator. More particularly, the overmolded insulator may be applied with a powder based process. For example, an insulating powder is applied over the RF rod components and the RF rod is placed in a high temperature and pressure environment in order to polymerize the powder into an insulating coating. Such an overmolding process provides excellent coverage directly on substantially all exposed surfaces of the components of the RF rod assembly. A grounded outer housing may be spaced apart from interior electrically conductive paths by an overmolded insulator and an air gap in order to further reduce capacitance. The improved electrical insulation also enables the use of higher voltages (e.g., up to approximately 10 kV) than existing RF rod systems. That is, arcing failure is mitigated in the modular RF rod assemblies described herein.

In some embodiments, the modular RF rod assembly may comprise a first electrical path and a second electrical path that are electrically isolated from each other by the overmolded insulator. The first electrical path may comprise a metal shell that is electrically coupled to an RF match and RF bias generator, and the second electrical path may comprise a metal rod that is electrically coupled to a direct current (DC) bias source. The DC rod may be used in order to supply a DC bias to an electrostatic chuck (ESC) within a chamber. The DC bias can be used in order to implement chucking. The metal RF shell may also be electrically coupled to the ESC in order to provide an RF bias to the ESC for propagation into the chamber. As noted above, the DC rod may be electrically insulated from the RF shell by the overmolded insulating layer. A second overmolded insulating layer may also be provided around the RF shell. The RF shell and the DC rod may be enclosed by the housing. The housing may also be electrically conductive. For example, the housing may be held at a ground potential.

Referring now to FIG. 1A, a schematic illustration of a plasma processing system 150 is shown, in accordance with an embodiment. In an embodiment, the plasma processing system 150 may comprise a chuck 105. The chuck 105 may be an ESC in some embodiments. The chuck 105 may be provided within a vacuum chamber (not shown). In an embodiment, the chuck 105 may be supplied with an RF bias and a DC bias. The RF bias may allow for coupling RF energy into the chamber, and the DC bias may be used to generate the electrostatic force that is used to secure a substrate (e.g., a wafer or the like) to the chuck 105.

In an embodiment, the RF bias may be supplied to the chuck 105 by a rod assembly 120. The rod assembly 120 may have an L-shape. For example, the rod assembly 120 may comprise a first portion 121 that is coupled to a second portion 122 at a corner 123. The first portion 121 may be oriented substantially orthogonally to the second portion 122 to form the L-shape. However, it is to be appreciated that the first portion 121 and the second portion 122 may be oriented at any suitable angle. In FIG. 1A, the rod assembly 120 is shown as a monolithic structure. However, as will be described in greater detail herein, the rod assembly 120 may comprise a modular structure with one or more electrical paths that are electrically isolated from each other by insulating layers.

In an embodiment, a first end of the rod assembly 120 is electrically coupled to the chuck 105, and a second end of the rod assembly 120 is electrically coupled to an RF match 151. As used herein, "electrically coupled" may refer to two components that are connected (either directly or with one or more intervening components) so that an electrical current or voltage can pass from a first of the two components to a second of the two components. In an embodiment, the RF match 151 may comprise any suitable impedance matching component or components that can be configured to reduce, minimize, and/or eliminate reflected power between an RF bias generator 152 and the chuck 105. In an embodiment, the RF bias generator 152 may be electrically coupled to the RF match 151 by any suitable coupling structure 153, such as a coaxial cable or the like.

In an embodiment, the chuck 105 may also be electrically coupled to a DC bias source 154 by an electrical path 155. In the illustrated embodiment, the electrical path 155 is provided outside of the rod assembly 120. However, as will be described in greater detail herein, the electrical path 155 that couples a DC bias to the chuck 105 may also be integrated within the rod assembly 120. In an embodiment, the DC bias source 154 may provide a continuous DC bias, a pulsed DC bias, or any other suitable form of a DC bias to the chuck 105.

Figure 1B:
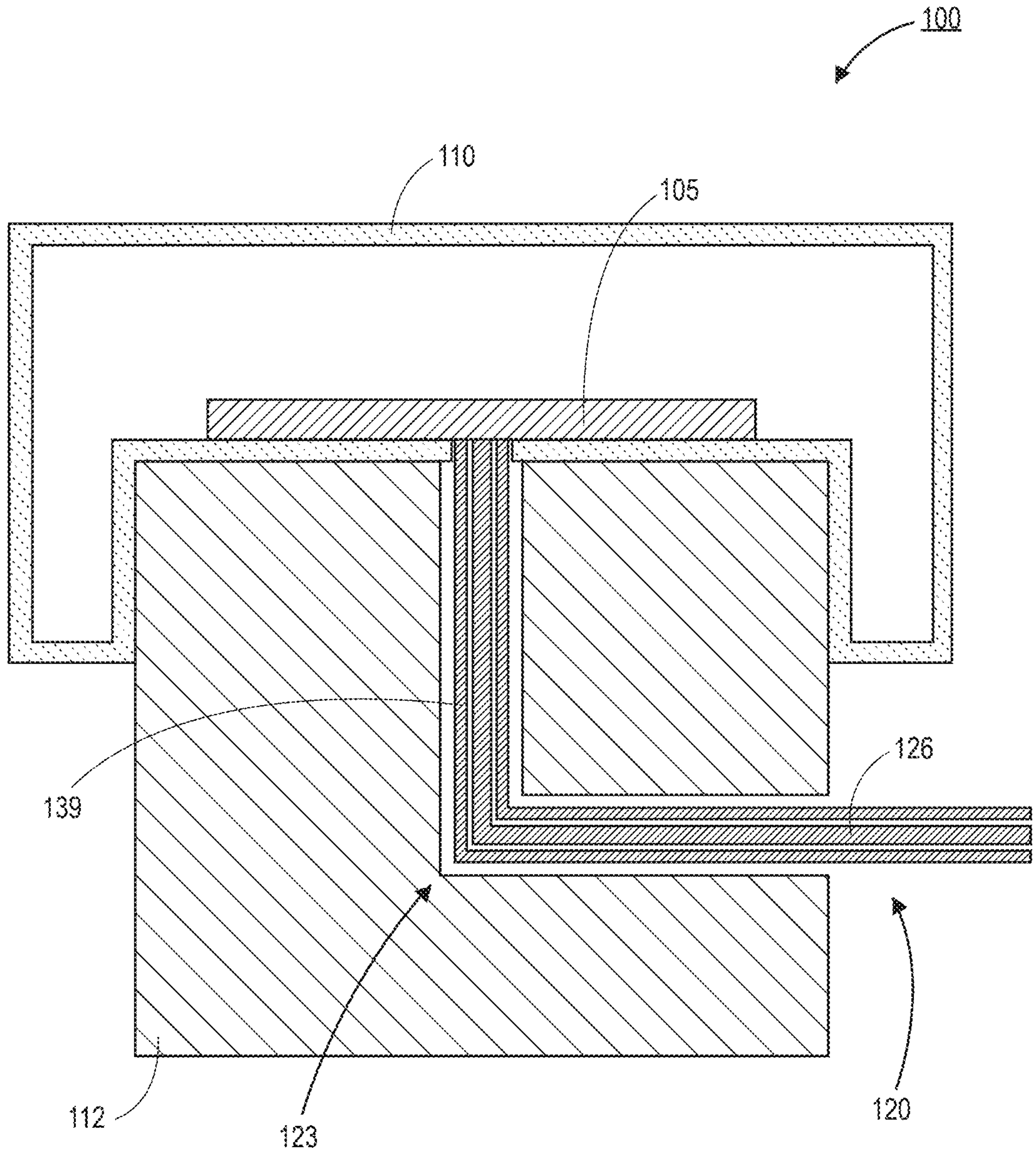
FIG. 1B is a cross-sectional illustration of a portion of a plasma processing tool that comprises an L-shaped rod assembly with a first electrical path and a second electrical path around the first electrical path, in accordance with an embodiment.

Referring now to FIG. 1B, a cross-sectional schematic illustration of a processing tool 100 is shown, in accordance with an embodiment. In an embodiment, the processing tool 100 may comprise a chamber 110. The chamber 110 may be a vacuum chamber for etching processes, deposition processes, treatment processes, and/or the like. Components for flowing gasses into the chamber 110 (e.g., a showerhead, etc.), exhaust systems, and/or the like are omitted from FIG. 1B for simplicity.

As shown, the chuck 105 is provided within the chamber 110. For example, the chuck 105 may be provided at a lower portion of the chamber 110. A plasma (not shown) may be generated within the chamber 110 over the chuck 105 in order to process a substrate (not shown) that is secured by the chuck 105. However, in other embodiments, the processing tool 100 may comprise a remote plasma system (RPS) that is used to generate a plasma upstream of the chamber 110.

In an embodiment, a pedestal 112 may be provided below the chuck 105. The pedestal 112 is shown as being outside of the chamber 110 in FIG. 1B. However, in other embodiments portions of the pedestal 112 may extend into a portion of the chamber 110. The pedestal 112 is illustrated as a monolithic block in FIG. 1B for simplicity. However, in other embodiments, the pedestal 112 may comprise a plurality of components in order to provide electrical and/or fluid pathways for coupling electrical power, gasses, fluids, and/or the like to the chamber 110. For example, fluid for cooling the chuck 105 may pass through the pedestal 112, and/or gas passages for purging the chamber may be provided in the pedestal 112.

In an embodiment, the rod assembly 120 may pass through the pedestal 112 to deliver one or more biases to the chuck 105. In a particular embodiment, the rod assembly 120 comprises a first electrical path 139 for delivering RF power to the chuck 105 in order to provide an RF bias to the chamber 110. In such an embodiment, the rod assembly 120 may have a first end that is coupled to an RF match (not shown) and a second end that is coupled to the chuck 105. In the cross-sectional plane of FIG. 1B, an upper portion and a lower portion of an electrically conductive shell (e.g., a copper shell) is shown.

In an embodiment, the rod assembly 120 may further comprise a second electrical path 126 that is surrounded by the first electrical path 139. The second electrical path 126 may comprise an electrically conductive rod, such as a copper rod. The second electrical path 126 may have a first end that is electrically coupled to the chuck 105 and a second end that is electrically coupled to a DC bias source (not shown). The second electrical path 126 may provide a DC bias to the chuck 105 to enable the generation of an electrostatic force for securing a substrate (not shown) to the chuck 105.

In the illustrated embodiment, the first electrical path 139 is separated from the second electrical path 126 by an air gap. However, it is to be appreciated that an insulating layer may be provided between the first electrical path 139 and the second electrical path 126, as will be described in greater detail herein. Additionally, the first electrical path 139 and the second electrical path 126 are illustrated as monolithic structures. However, embodiments may include a modular rod assembly 120 that comprises a first electrical path 139 with a plurality of segments and/or a second electrical path 126 with a plurality of segments. The use of a modular assembly may simplify the manufacture, assembly, and/or maintenance of the rod assembly 120 in some embodiments.

In an embodiment, the rod assembly 120 may comprise an L-shaped design. For example, a horizontal portion may be coupled to a vertical portion at a corner 123. The horizontal portion may be oriented approximately ninety degrees with respect to the vertical portion. However, any suitable angle between the horizontal portion and the vertical portion may be used in other embodiments. In the illustrated embodiment, the first electrical path 139 is the outermost layer of the rod assembly 120. Other embodiments may include an electrically grounded housing (not shown) that surrounds the first electrical path 139.

Figure 2A:
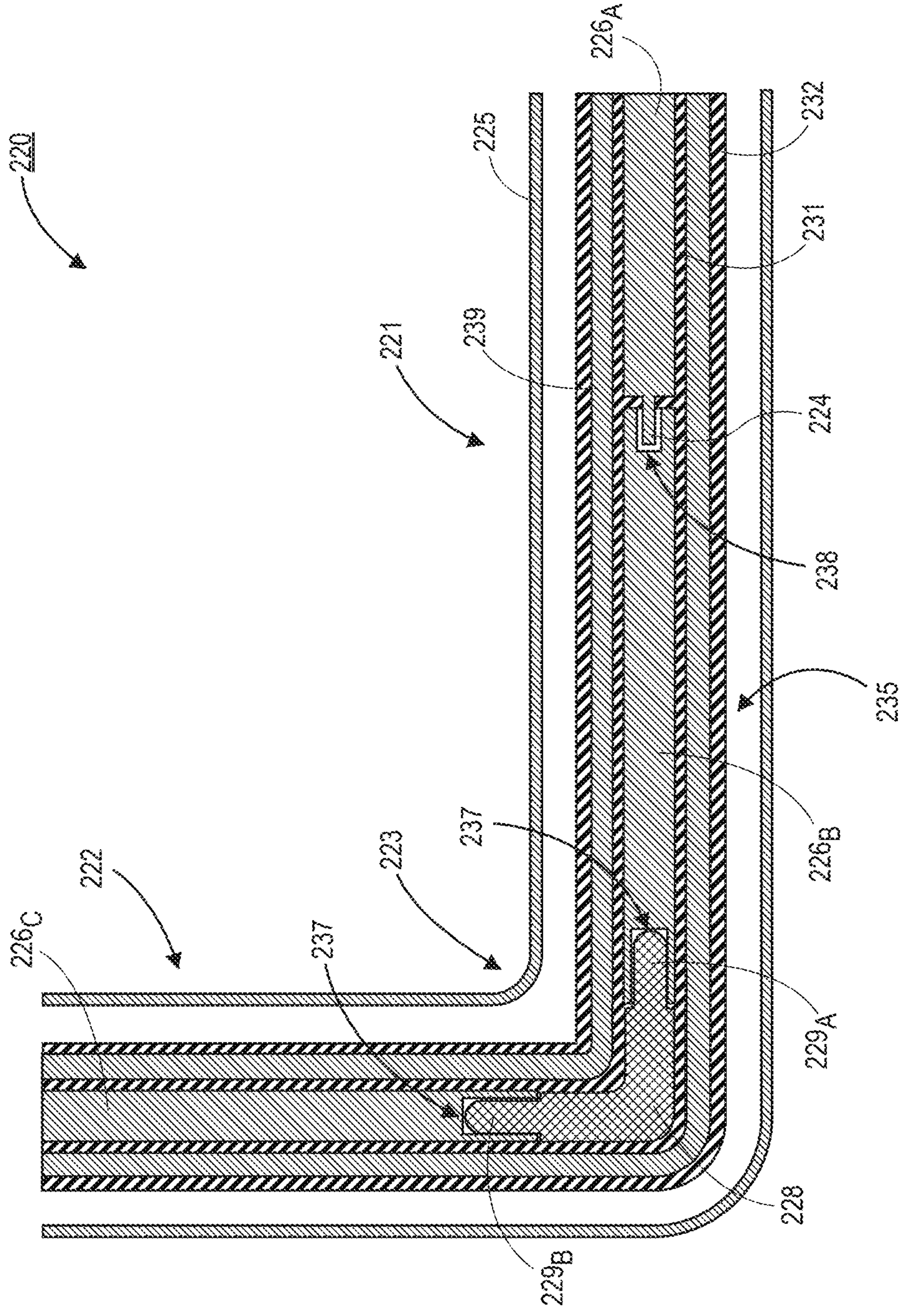
FIG. 2A is a cross-sectional illustration of a portion of an L-shaped rod assembly with a first electrical path that comprises a plurality of segments and a second electrical path that is a shell around the first electrical path, in accordance with an embodiment.

Referring now to FIG. 2A, a cross-sectional illustration of a rod assembly 220 is shown, in accordance with an embodiment. In an embodiment, the rod assembly 220 may comprise a horizontal portion 221 and a vertical portion 222. The horizontal portion 221 may be oriented at an angle of approximately ninety degrees with respect to the vertical portion 222. However, it is to be appreciated that any suitable angle between the horizontal portion 221 and the vertical portion 222 may be used in other embodiments. In some instances, the orientation of the horizontal portion 221 with respect to the vertical portion 222 may result in a rod assembly 220 that is considered as having an L-shape. As used herein, an L-shaped rod assembly 220 may refer to a rod assembly 220 that has a horizontal portion 221 with a first centerline and a vertical portion 222 with a second centerline, where the first centerline and the second centerline intersect at an angle between approximately 80° and approximately 110°.

In an embodiment, the rod assembly 220 may comprise a first electrical path 239 and a second electrical path 226. The first electrical path 239 may be used to supply an RF bias to the chuck (not shown in FIG. 2A), and the second electrical path 226 may be used to supply a DC bias to the chuck.

In an embodiment, the second electrical path 226 may comprise a plurality of electrically conductive segments. For example, a first segment $\mathbf{226}_A$ may be electrically coupled to a second segment $\mathbf{226}_B$ at a joint. The joint may include a tab 224 that extends out from the first segment $\mathbf{226}_A$ and a recess 238 that is formed into an end of the second segment $\mathbf{226}_B$. The tab 224 may directly contact at least a portion of a surface of the recess 238 in order to provide an electrical connection between the first segment $\mathbf{226}_A$ and the second segment $\mathbf{226}_B$. While a first segment $\mathbf{226}_A$ and a second segment $\mathbf{226}_B$ are shown within the horizontal portion 221 of the rod assembly 220, it is to be appreciated that any number of segments (e.g., one or more segments) may be used to form the horizontal portion 221 of the second electrical path 226.

In an embodiment, the second electrical path 226 may further comprise a third segment $\mathbf{226}_C$ along the vertical portion 222 of the rod assembly 220. While a single third segment $\mathbf{226}_C$ is shown along the vertical portion 222 of the second electrical path 226, it is to be appreciated that a plurality of segments may be electrically coupled together (e.g., with an interface similar to the recess 238 and tab 224 between the first segment $\mathbf{226}_A$ and $\mathbf{226}_B$). In an embodiment, the third segment $\mathbf{226}_C$ may be electrically coupled to the second segment $\mathbf{226}_B$ by an electrically conductive bridge 228. In an embodiment, the electrically conductive bridge 228 has protrusions $\mathbf{229}_A$ and $\mathbf{229}_B$ that fit into slots 237 of the second segment $\mathbf{226}_B$ and the third segment $\mathbf{226}_C$. In an embodiment, the protrusions $\mathbf{229}_A$ and $\mathbf{229}_B$ may directly contact a surface of the slots 237 in order to provide an electrical connection between the conductive bridge 228 and the second segment $\mathbf{226}_B$ and the third segment $\mathbf{226}_C$.

The use of a modular second electrical path 226 allows for simpler manufacture, assembly, and maintenance of the rod assembly 220. For example, the individual segments $\mathbf{226}_{A-C}$ may be straight rods that do not require any bends. The L-shape can be provided by using the conductive bridge 228 that has the angled shape. The smaller conductive bridge 228 is easier to manufacture than a monolithic rod with a bend. Further, the conductive bridge 228 allows for a sharper angle to be formed compared to existing J-shaped rods. This may allow for a more compact rod assembly 220 compared to existing solutions.

In an embodiment, the second electrical path 226 may be surrounded by an electrically insulating first liner 231, such as a polymeric material. In an embodiment, the first liner 231 may be applied over the second electrical path 226 with a powder based overmolding process. For example, a powder is applied over the second electrical path 226 (i.e., the segments 226$_{A-C}$ and the conductive bridge 228), and the powder is converted into a polymeric coating through the application of a high temperature and a high pressure. Such an overmolding process allows for excellent contact between the first liner 231 and the second electrical path 226. As such, air gaps are avoided and capacitance is reduced. In some embodiments, the first liner 231 may comprise polytetrafluoroethylene (PTFE).

In an embodiment, the first electrical path 239 is provided over the first liner 231. In an embodiment, the first electrical path 239 may comprise an electrically conductive shell that surrounds the second electrical path 226 and the first liner 231. The first electrical path 239 may be used to deliver an RF bias to the chuck (not shown in FIG. 2A). In an embodiment, the first electrical path 239 is shown as a monolithic shell. However, it is to be appreciated that the first electrical path 239 may also be modular, as will be described in greater detail below with respect to FIG. 2B. The first electrical path 239 and the second electrical path 226 may comprise electrically conductive material, such as copper or the like. In an embodiment, a second liner 232 is provided over an outer surface of the first electrical path 239. The second liner 232 may also be formed with an overmolding process, similar to the first liner 231.

In an embodiment, a housing 225 may be provided around the first electrical path 239. The housing 225 may also be an electrically conductive material. For example, the housing 225 may comprise aluminum in some embodiments. In an embodiment, the housing 225 may be configured to be held at a ground potential. As shown, an air gap 235 is provided between the second liner 232 and the housing 225. The addition of the air gap 235 further reduces capacitance in some embodiments.

The overall structure of the rod assembly 220 enables significantly improved capacitance performance compared to existing solutions. That is, a capacitance between the first electrical path 239 and the housing 225 is significantly reduced. This allows for improved electrical efficiency (e.g., reduced leakage to ground). Additionally, the electrical insulation between conductive layers (e.g., the second electrical path 226, the first electrical path 239, and the housing 225) allows for improved resistance to arcing and/or the like. As such, higher voltages can be supplied along the rod assembly 220. For example, voltages up to approximately 10 kV can be supplied along the rod assembly 220.

Figure 2B:
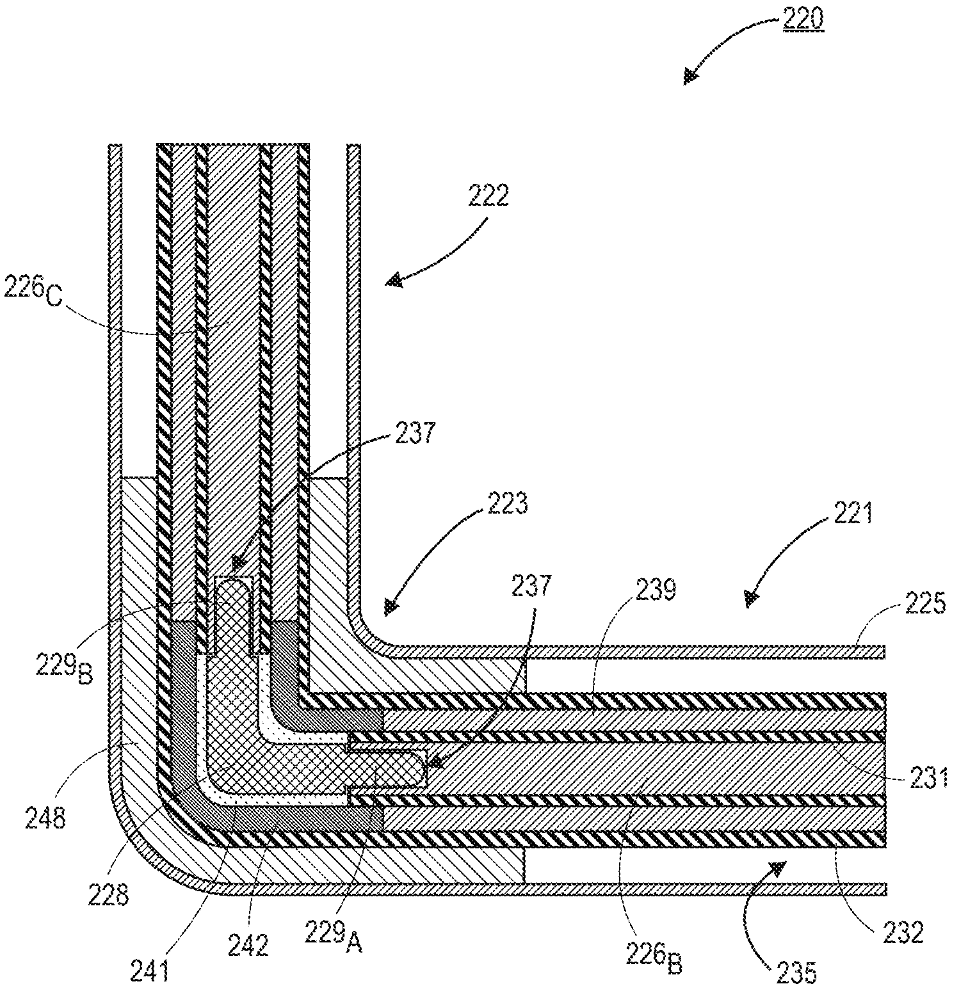
FIG. 2B is a cross-sectional illustration of a portion of an L-shaped rod assembly that illustrates a more detailed view of the corner region of the L-shaped rod assembly, in accordance with an embodiment.

Referring now to FIG. 2B, a cross-sectional illustration of the corner region 223 of the rod assembly 220 is shown, in accordance with an embodiment. As shown, the bridge 228 may be overmolded with a third liner 241. The third liner 241 may be coupled to the first liner 231 with a fusing process or the like. Accordingly, while shown as distinct components in FIG. 2B, it is to be appreciated that the first liner 231 and the third liner 241 may appear as a monolithic part that surrounds the second segment 226$_B$, the bridge 228, and the third segment 226$_C$. However, the fusing process between the first liner 231 and the third liner 241 allows for easier manufacture and assembly of the rod assembly 220.

Additionally, the first electrical path 239 may include an electrically conductive coupler 242 at the corner region 223. The use of such a coupler 242 allows for a modular construction that enables the first electrical path 239 to have linear tubes. As such, the tube for the first electrical path 239 does not need to be bent into shape, as is the case in existing RF rod solutions. In an embodiment, the coupler 242 and other portions of the corner region 223 may be embedded within an insulating corner reinforcement 248. The insulated corner reinforcement may be formed from a plurality of individual parts that are fitted together, as will be described in greater detail below. As shown, the insulating corner reinforcement 248 may directly contact a portion of the housing 225. As such, the air gap 235 may not be continuous along an interior surface of the housing 225 in some embodiments.

Figure 3A:
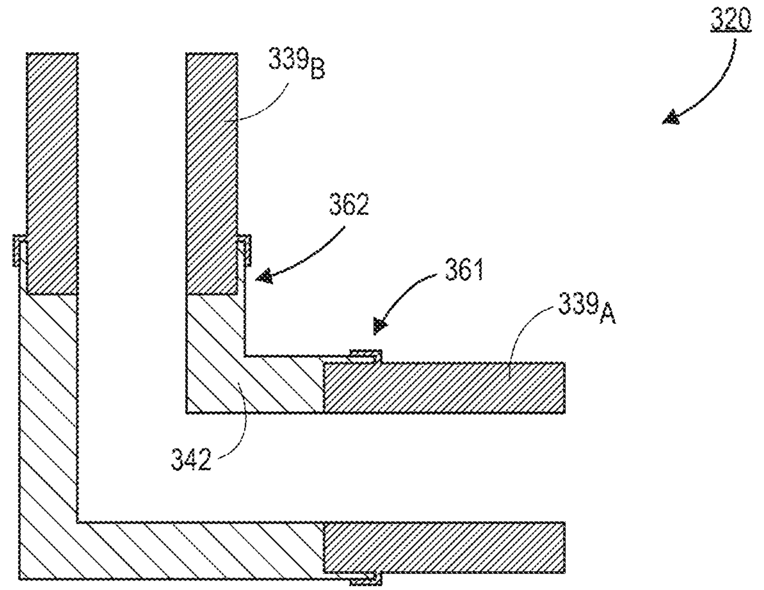
FIG. 3A is a cross-sectional illustration of a corner region of the second electrical path, in accordance with an embodiment.

Referring now to FIG. 3A, a cross-sectional illustration of a portion of rod assembly 320 is shown, in accordance with an embodiment. In FIG. 3A, a corner region of the first electrical path 339 is shown in isolation in order to more clearly illustrate an interface between the first electrical path 339$_{A-B}$ and the coupler 342. In an embodiment, the horizontal portion of the first electrical path 339$_A$ and the vertical portion of the first electrical path 339 may comprise external notches 361, and the coupler 342 may comprise protrusions 362 that fit into the notches 361. In such an embodiment, the notches 361 and the protrusions 362 secure the horizontal and vertical portions of the first electrical path 339$_{A-B}$ to the coupler 342 in order to provide a secure connection that allows for improved electrical coupling between the components. In some embodiments, only the mechanical coupling of the notches 361 and the protrusions 362 are necessary to provide the desired electrical conductivity along the first electrical path 339. However, in other embodiments, a brazing, welding, or other fusion process may be used (alone or in combination with a mechanical coupling) in order to provide the desired electrical conductivity along the first electrical path 339. While a particular example of a notch 361 and protrusion 362 architecture is shown in FIG. 3A, it is to be appreciated that any suitable mechanical coupling may be used between the horizontal and vertical portions of the first electrical path 339$_{A-B}$ and the coupler 342.

Figure 3B:
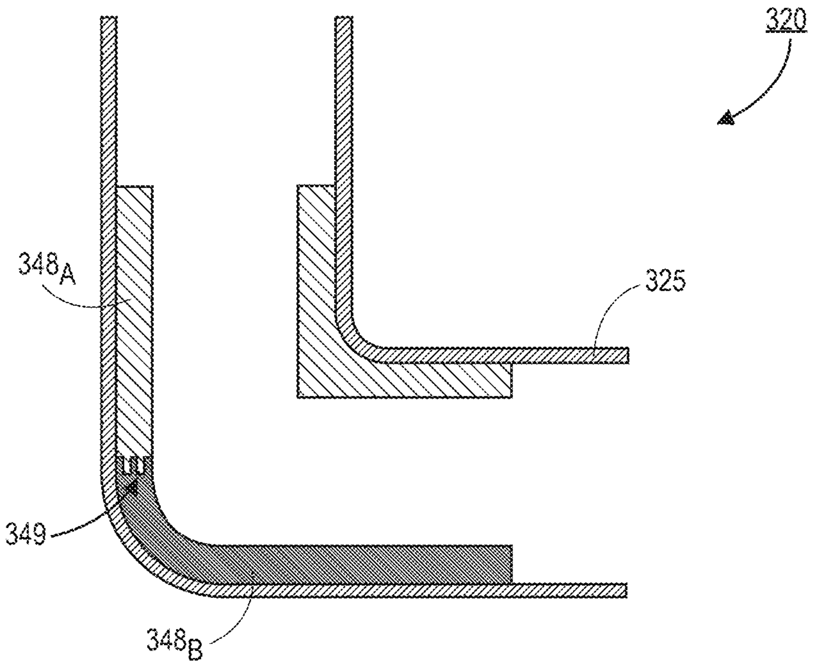
FIG. 3B is a cross-sectional illustration of a corner region of the outer housing and an insulating corner reinforcement, in accordance with an embodiment.

Referring now to FIG. 3B, a cross-sectional illustration of a portion of a rod assembly 320 is shown, in accordance with an additional embodiment. In FIG. 3B, the outer housing 325 and the insulating corner reinforcement 348 are shown in greater detail. As shown, the insulating corner reinforcement 348 may comprise a plurality of discrete components 348$_A$ and 348$_B$. In such an embodiment, the multiple components may be press fit together in order to surround the corner region of the interior first electrical path and second electrical path (both omitted for simplicity). For example, a mechanical coupling region 349 may be provided in order to secure the first component 348$_A$ to the second component 348$_B$. The use of a plurality of components 348$_{A-B}$ that are press fit together allows for easier assembly since the first electrical path and the second electrical path can be assembled first, and the insulating corner reinforcement 348 can be attached around the corner region.

Figure 4:
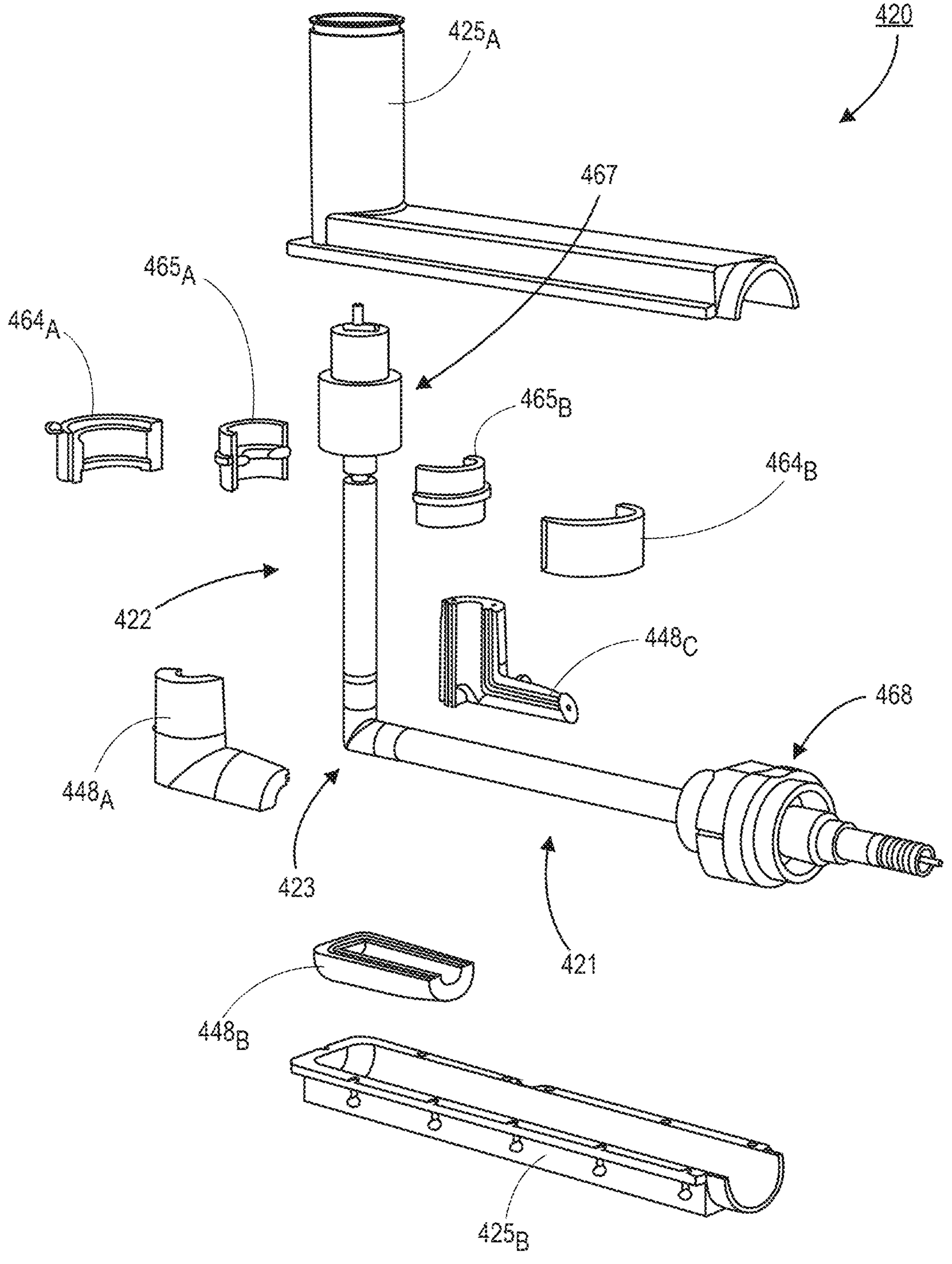
FIG. 4 is an exploded view illustration of an L-shaped rod assembly, in accordance with an embodiment.

Referring now to FIG. 4, an exploded view illustration of a portion of a rod assembly 420 is shown, in accordance with an embodiment. As shown, a horizontal portion 421 is coupled to a vertical portion 422 at a corner region 423. The outer surfaces of the vertical portion 422, the corner region 423, and the horizontal portion 421 may be coated in an overmolded insulator, such as those described in greater detail below. A first electrical path (for carrying an RF bias) and a second electrical path (for carrying a DC bias) may be provided under the overmolded insulators. The first electrical path and/or the second electrical path may each comprise a plurality of components in order to form modular electrical paths similar to any of those described in greater detail herein. In an embodiment, an insulating corner reinforcement 448 may be assembled around the corner region 423. For example, the illustrated insulating corner reinforcement 448 may comprise a plurality of components $\mathbf{448}_{A\text{-}C}$ that are press fit together around the corner region 423.

In an embodiment, a split insulator $\mathbf{465}_{A\text{-}B}$ and a collar $\mathbf{464}_{A\text{-}B}$ may be provided around an upper end of the vertical portion 422 below a connector 467. The connector 467 may provide structures for electrically coupling the rod assembly 420 to a cathode assembly (not shown) of the chuck (not shown). In an embodiment, a connector 468 may be provided at an end of the horizontal portion 421 for coupling the rod assembly 420 to an RF match (not shown) and/or a DC bias source (not shown). In an embodiment, the housing 425 may be provided around the rod assembly 420. In an embodiment, the housing 425 is also modular with a top portion $\mathbf{425}_A$ and a bottom portion 425 that fit together to surround the rod assembly 420.

Figure 5:
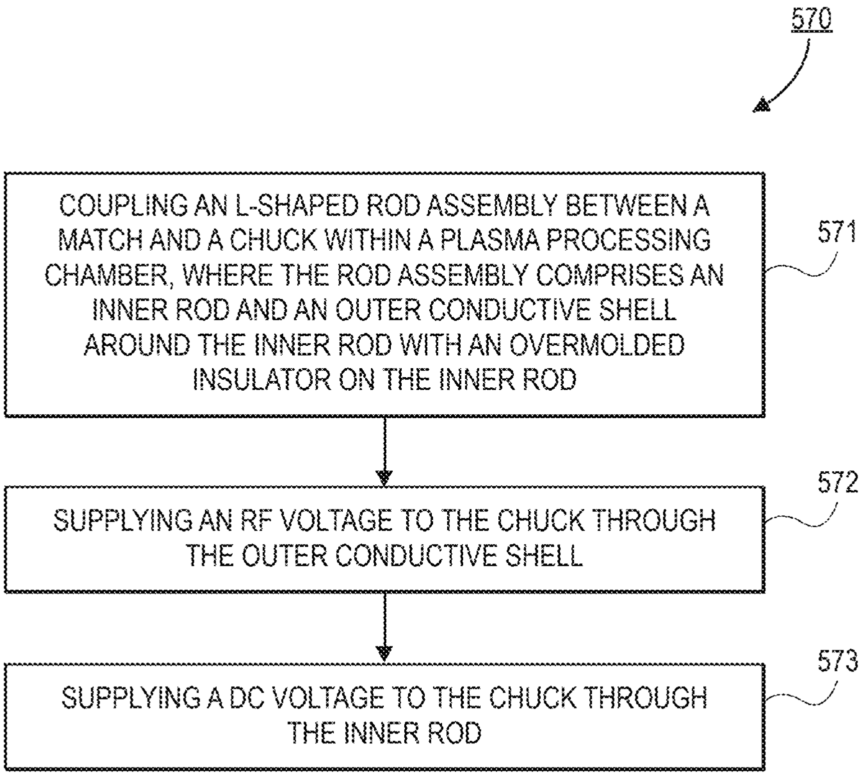
FIG. 5 is a flow diagram of a process for supplying an RF bias and a DC bias to a chuck within a chamber with an L-shaped rod assembly, in accordance with an embodiment.

Referring now to FIG. 5, a flow diagram of a process 570 for supplying an RF bias and a DC bias to a chuck is shown, in accordance with an embodiment. In an embodiment, the process 570 may begin with operation 571, which comprises coupling an L-shaped rod assembly between a match and a chuck within a plasma processing chamber. In an embodiment, the L-shaped rod assembly may be similar to any of the rod assemblies described in greater detail herein. For example, the rod assembly May comprise an inner rod and an outer conductive shell around the inner rod. In an embodiment, an overmolded insulator may be provided on the inner rod to electrically isolate the inner rod from the outer conductive shell. In an embodiment, the outer conductive shell may also be overmolded with a similar insulator. A grounded housing may be provided around the outer conductive shell, and an air gap may be provided between the insulator over the outer conductive shell and an interior surface of the grounded housing.

In an embodiment, the rod assembly may be a modular rod assembly. For example, the inner rod may comprise a plurality of segments with a bridge that couples a vertical segment to a horizontal segment. Similarly, the outer conductive shell may have a horizontal shell that is coupled to a vertical shell by an electrically conductive coupler. An insulating corner reinforcement within the conductive housing may surround a corner region of the inner rod and the outer conductive shell.

In an embodiment, the process 570 may continue with operation 572, which comprises supplying an RF voltage to the chuck through the outer conductive shell. For example, a first end of the outer conductive shell may be electrically coupled to the chuck, and a second end of the outer conductive shell may be electrically coupled to an RF match and an RF bias generator.

In an embodiment, the process 570 may continue with operation 573, which comprises supplying a DC voltage to the chuck through the inner rod. For example, a first end of the inner rod may be electrically coupled to the chuck, and a second end of the inner rod may be electrically coupled to a DC bias source. The DC bias source may supply a constant DC voltage, a pulsed DC voltage, or any other suitable form of DC voltage.

Figure 6:
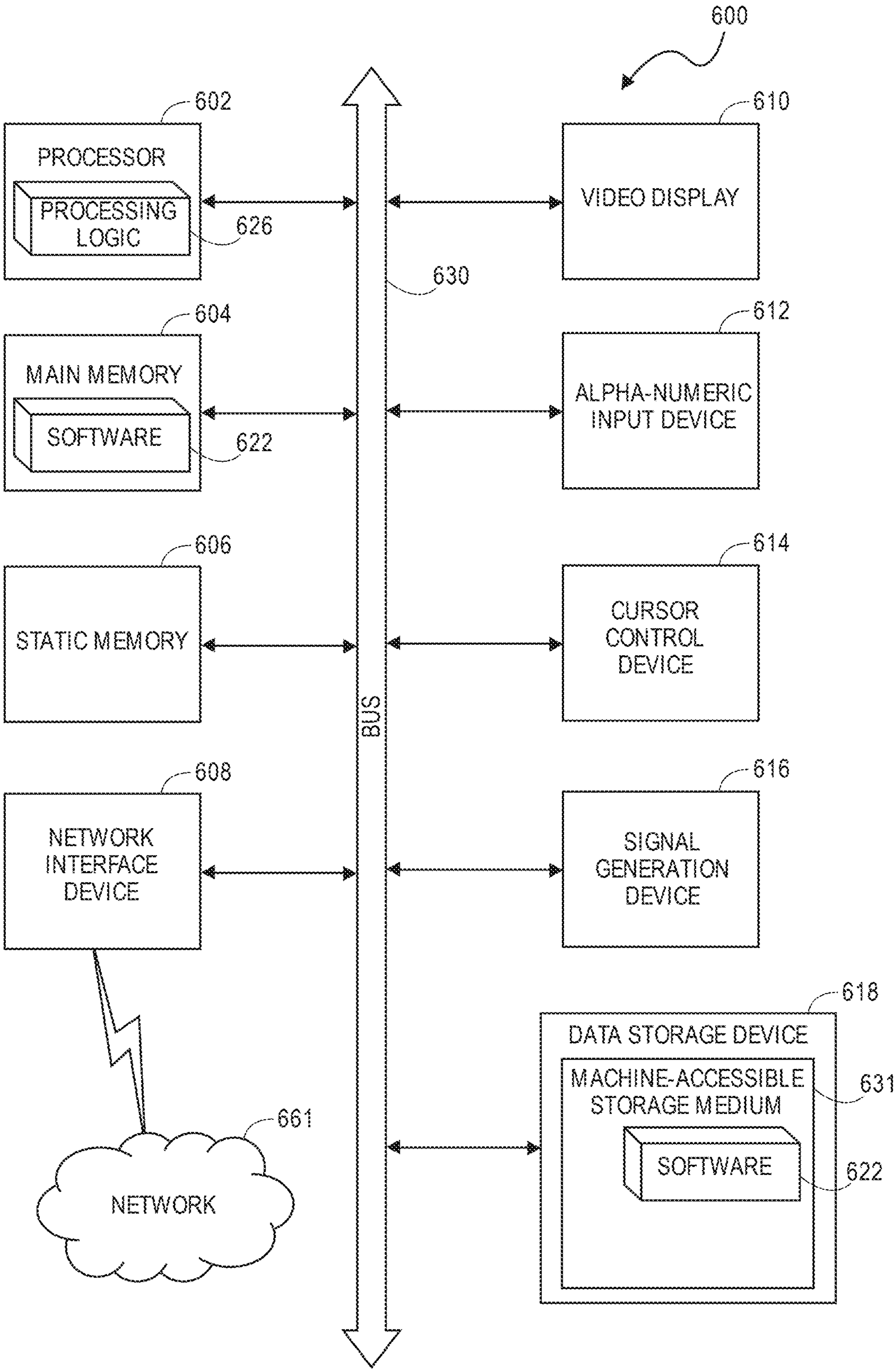
FIG. 6 illustrates a block diagram of an exemplary computer system of a processing tool, in accordance with an embodiment of the present disclosure.

Referring now to FIG. 6, a block diagram of an exemplary computer system 600 of a processing tool is illustrated in accordance with an embodiment. In an embodiment, computer system 600 is coupled to and controls processing in a processing tool suitable for implementing one or more operations for supplying an RF bias and/or a DC bias to a chuck with an L-shaped rod assembly.

Computer system 600 may be connected (e.g., networked) to other machines in a Local Area Network (LAN), an intranet, an extranet, or the Internet. Computer system 600 may operate in the capacity of a server or a client machine in a client-server network environment, or as a peer machine in a peer-to-peer (or distributed) network environment. Computer system 600 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for computer system 600, the term "machine" shall also be taken to include any collection of machines (e.g., computers) that individually or jointly execute a set (or multiple sets) of instructions to perform any one or more of the methodologies described herein.

Computer system 600 may include a computer program product, or software 622, having a non-transitory machine-readable medium having stored thereon instructions, which may be used to program computer system 600 (or other electronic devices) to perform a process according to embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, computer system 600 includes a system processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

System processor 602 represents one or more general-purpose processing devices such as a microsystem processor, central processing unit, or the like. More particularly, the system processor may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. System processor 602 may also be one or more special-purpose processing devices such as an application specific integrated circuit (ASIC), a field programmable gate array (FPGA), a digital signal system processor (DSP), network system processor, or the like. System processor 602 is configured to execute the processing logic 626 for performing the operations described herein.

The computer system 600 may further include a system network interface device 608 for communicating with other devices or machines. The computer system 600 may also include a video display unit 610 (e.g., a liquid crystal display (LCD), a light emitting diode display (LED), or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-accessible storage medium 631 (or more specifically a computer-readable storage medium) on which is stored one or more sets of instructions (e.g., software 622) embodying any one or more of the methodologies or functions described herein. The software 622 may also reside, completely or at least partially, within the main memory 604 and/or within the system processor 602 during execution thereof by the computer system 600, the main memory 604 and the system processor 602 also constituting machine-readable storage media. The software 622 may further be transmitted or received over a network 661 via the system network interface device 608. In an embodiment, the network interface device 608 may operate using RF coupling, optical coupling, acoustic coupling, or inductive coupling.

While the machine-accessible storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies. The term "machine-readable storage medium" shall accordingly be taken to include, but not be limited to, solid-state memories, and optical and magnetic media.

Thus, embodiments of the present disclosure include systems and methods for supplying an RF bias and/or a DC bias to a chuck with an L-shaped rod assembly that comprises an overmolded modular inner rod with a modular conductive shell around the modular inner rod.

The above description of illustrated implementations of embodiments of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

What is claimed is:

1. An apparatus, comprising:

an inner rod assembly, wherein the inner rod assembly comprises:

a first rod;

a second rod oriented approximately ninety degrees with respect to the first rod; and a bridge electrically coupled to the first rod and the second rod;

a first insulator over an outer surface of the inner rod assembly;

a shell around the inner rod assembly:

a second insulator over an outer surface of the shell; and a housing surrounding shell, wherein an interior surface of the housing is spaced away from the second insulator by an air gap.

2. The apparatus of claim 1, wherein the first insulator and the second insulator comprise polytetrafluoroethylene (PTFE).

3. The apparatus of claim 1, wherein the first insulator is overmolded on the inner rod assembly, and wherein the second insulator is overmolded on the shell.

4. The apparatus of claim 1, wherein the shell comprises:

a first shell segment around the first rod;

a second shell segment around the second rod; and a corner coupler that is electrically coupled to the first shell segment and the second shell segment.

5. The apparatus of claim 1, wherein the bridge comprises a first protrusion and a second protrusion, wherein the first protrusion is inserted into a first slot in the first rod and the second protrusion is inserted into a second slot in the second rod.

6. The apparatus of claim 1, further comprising:

a third insulator around the bridge, wherein the third insulator is provided between the second insulator and the housing.

7. The apparatus of claim 1, wherein the shell is electrically coupled to a radio frequency (RF) match.

8. The apparatus of claim 1, wherein the inner rod assembly is electrically coupled to a direct current (DC) bias source.

9. The apparatus of claim 1, wherein the inner rod assembly and the shell are electrically coupled to a chuck.

10. The apparatus of claim 1, wherein the first rod comprises a plurality of segments.

11. An apparatus, comprising:

a chamber;

a chuck within the chamber; and a rod assembly electrically coupled to the chuck, wherein the rod assembly comprises:

a first electrical conductor;

a first insulator over the first electrical conductor;

a second electrical conductor around the first insulator;

a second insulator over the second electrical conductor; and a housing around the second insulator, wherein at least a portion of the housing is spaced away from the second insulator by an air gap.

12. The apparatus of claim 11, wherein the rod assembly has an L-shape.

13. The apparatus of claim 11, wherein the first insulator is overmolded over the first electrical conductor, and wherein the second insulator is overmolded over the second electrical conductor.

14. The apparatus of claim 13, wherein the first insulator and the second insulator comprise polytetrafluoroethylene (PTFE).

15. The apparatus of claim 11, wherein the rod assembly is electrically coupled to a radio frequency (RF) match and a direct current (DC) bias source.

16. The apparatus of claim 11, wherein the first electrical conductor comprises a first rod that is electrically coupled to a second rod by a bridge.

17. An apparatus, comprising:

an inner rod assembly, wherein the inner rod assembly comprises:

a first rod;

a second rod; and a bridge electrically coupled to the first rod and the second rod, wherein the inner rod assembly has an L-shape;

a first insulator over an outer surface of the inner rod assembly;

a shell around the inner rod assembly, wherein an inner surface of the shell directly contacts the first insulator:

a second insulator over an outer surface of the shell;

an insulating corner reinforcement around the bridge, wherein the insulating corner reinforcement wraps around the shell; and a housing surrounding the shell, wherein a portion of an interior surface of the housing is spaced away from the second insulator by an air gap.

18. The apparatus of claim 17, wherein the inner rod assembly is electrically coupled to a direct current (DC) bias source, and wherein the shell is electrically coupled to a radio frequency (RF) match.

19. The apparatus of claim 17, wherein the shell comprises:

a first tube;

a second tube; and an electrically conductive corner coupler that is electrically coupled to the first tube and the second tube.

20. The apparatus of claim 17, further comprising:

an electrostatic chuck, wherein the inner rod assembly and the shell are electrically coupled to the electrostatic chuck.

* * * * *